US011836139B2

(12) United States Patent
Xu et al.

(10) Patent No.: US 11,836,139 B2
(45) Date of Patent: Dec. 5, 2023

(54) RANKING PROPERTY LISTING SEARCH RESULTS

(71) Applicant: AIRBNB, Inc., San Francisco, CA (US)

(72) Inventors: Tao Xu, Palo Alto, CA (US); Haibin Cheng, San Jose, CA (US); Malay Haldar, Foster City, CA (US); Brendan Marshall Collins, San Francisco, CA (US)

(73) Assignee: AIRBNB, INC., San Francisco, CA (US)

( * ) Notice: Subject to any disclaimer, the term of this patent is extended or adjusted under 35 U.S.C. 154(b) by 0 days.

(21) Appl. No.: 15/949,834

(22) Filed: Apr. 10, 2018

(65) Prior Publication Data

US 2019/0311044 A1   Oct. 10, 2019

(51) Int. Cl.
*G06F 16/2457* (2019.01)
*G06N 20/00* (2019.01)
*G06Q 10/02* (2012.01)
*G06N 3/04* (2023.01)
*G06N 5/00* (2023.01)
*G06N 20/20* (2019.01)

(52) U.S. Cl.
CPC ....... *G06F 16/24578* (2019.01); *G06N 20/00* (2019.01); *G06Q 10/02* (2013.01)

(58) Field of Classification Search
CPC .. G06F 16/24578; G06N 20/00; G06N 20/20; G06N 5/003; G06N 3/0454; G06Q 10/02
USPC .......................................................... 705/5
See application file for complete search history.

(56) References Cited

U.S. PATENT DOCUMENTS 6,272,467 B1 * 8/2001 Durand .................. G06Q 10/02
                                                    705/26.1
9,811,785 B1   11/2017 Bion et al.
(Continued)

FOREIGN PATENT DOCUMENTS

WO   WO-2015004607 A2 *  1/2015 ........... G06F 16/338

OTHER PUBLICATIONS

Hatmaker, Taylor; "Honing its dynamic pricing formula, Vacasa wants to make homeowners more cash than Airbnb"; https://techcrunch.com/2017/04/20/vacasa-yield-management-2-0-portland-vacation-rentals/; Apr. 20, 2017. (Year: 2017).*
(Continued)

*Primary Examiner* — Dione N. Simpson
(74) *Attorney, Agent, or Firm* — Morgan, Lewis & Bockius LLP

(57) ABSTRACT

An online reservation system is configured to receive requests from a guest for searching property listings and to return property listings that satisfy the search criteria of the requests. The online reservation system uses a machine learning system to rank the property listings returned by the search. The machine learning system uses objective functions to determine parameters for each property listing and assign a ranking based on the parameters. A first objective function generates a parameter indicating an extent to which a property listing matches preferences of the guest, and is based on data about the guest's interactions with the reservation system. A second objective function generates another parameter indicating an extent to which the search request matches the preferences of the host associate with the property listing, and is based on data about the host's responses to reservation requests.

21 Claims, 6 Drawing Sheets

(56) References Cited

U.S. PATENT DOCUMENTS

| | | | |
|---|---|---|---|
| 2012/0158621 A1* | 6/2012 | Bennett | G06F 16/334 706/12 |
| 2014/0278591 A1* | 9/2014 | Blecharczyk | G06Q 10/02 705/5 |
| 2015/0206072 A1* | 7/2015 | Fabris | G06Q 10/02 705/5 |
| 2015/0206258 A1 | 7/2015 | Charkov et al. | |
| 2016/0098649 A1 | 4/2016 | Ifrach et al. | |
| 2016/0148237 A1 | 5/2016 | Ifrach et al. | |
| 2017/0178036 A1* | 6/2017 | Xu | G06F 16/9535 |
| 2017/0323402 A1* | 11/2017 | Fishberg | G06Q 30/0283 |

OTHER PUBLICATIONS

"Deep Learning, NLP, and Representations," http://colah.github.io/posts/2014-07-NLP-RNNs-Representations/, Jul. 7, 2014, 12 pages.

\* cited by examiner

RANKING PROPERTY LISTING SEARCH RESULTS

BACKGROUND

Online reservation systems typically provide listings of properties, such as houses, condominiums, rooms, apartments, lots, and other real estate, that a user (referred to hereafter as a "guest") may reserve for a specified time period (e.g., a day, week, month, or other period of interest). As an example, when a guest is planning a vacation or other type of trip, he or she may use an online reservation system to search property listings in order to find properties of interest for renting during the trip. The online reservation system may return a list of property listings based on search criteria the guest has specified for the online reservation system, such as price ranges, dates, number of bedrooms, and other factors that may be of interest to guests in reserving properties, so that the system is more likely to return results of interest to the guest. Providing the guest with more desirable property listings not only enhances the guest's experience with the reservation system, making it more likely that he or she will use the system for future reservations, but also increases the likelihood that the guest will find a property of interest and use the system to make a reservation, sometimes referred to as a "booking."

Each property listing returned as a result of the search by the online reservation system may be positioned within the list based on information such as how well it matches the guest's preferences and the search criteria that the guest has specified. For example, an algorithm trained using machine learning techniques, such as LambdaRank, may be applied to determine ranking associated with property listings. The algorithm may account for various information, such as that the guest prefers to reserve properties in certain locations, within a certain price range, during certain times, or that include with specific features, such as properties with a certain number of bedrooms and bathrooms, those with a swimming pool, properties in a particular location or within a certain proximity of points of interest. If the guest has previously used the online reservation system, the reservation system may use this information when assigning each property a position within the ordered listing, such as based on information about properties the guest has previously viewed, attempted to reserve, booked or interacted with in other ways.

However, even when the reservation system returns a list of property listings ranked to reflect which property listings closely match a guest's preferences, the guest nevertheless may be unable to make a reservation for a desired property listing. Hosts may reject a reservation request for a variety of reasons not related to a guest's preferences and of which guests are unaware. For example, if a guest selects a property listing and submits a request to make a reservation for a period that will prevent the host from accepting an additional reservation request, cleaning the property, or various other reasons, there is some likelihood that the host will reject the guest's request for that reason. Thus, the host will reject the reservation request for the property, even though it closely matches the guest's preferences, and even though the reason may be unclear to the guest. This can increase guest frustration, and reduce the likelihood that the guest will book a property or use the online reservation system in the future.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

DETAILED DESCRIPTION

The present disclosure generally pertains to improved techniques for ranking property listing search results provided to guests by an online reservation system. In some embodiments of the present disclosure, an online reservation system is configured to receive requests from a guest for searching property listings. For each such search request, the system is configured to return a plurality of property listings that satisfy the search criteria of the request. The online reservation system ranks the property listings, and then returns the plurality of property listings as an ordered list that is then provided to the guest.

The online reservation system includes ranking logic that is used to determine the position of each property listing within the ordered list provided to the guest. The ranking logic can use machine learning techniques to identify an extent to which each property listing returned by the search matches preferences of the guest requesting the search. For example, the ranking logic can analyze information about the guest's preferences based on prior interactions with ordered lists provided by the online reservation system, such as information about the guest's interactions with prior property listing search requests, reservation requests, and reservations. Using this information, the ranking logic is trained to assign a guest preference ranking parameter to each of the property listings included in the ordered list indicating the extent to which each property listing matches the guest's preferences.

The ranking logic also can apply machine learning techniques to identify an extent to which the search request matches preferences of each host associated with property listings identified and returned by the search. For example, the ranking logic can analyze information about the host's preferences based on the host's prior responses to reservation requests received from guests via the online reservation system. Using this information, the ranking logic is trained to assign a host preference ranking parameter to each of the property listings included in the ordered list indicating the extent to which the search request matches the host's preferences.

Based on these parameters, the ranking logic can control the order in which property listings within the ordered list appear. For example, the ranking logic can compare the parameters for each property listing and an order to each listing based on the comparison. It has been observed that, by controlling rankings of property listings within the ordered list based on both preferences of the guest requesting the search and preferences of the host for the property listings identified by the search request, guests will be more likely to request to reserve property listings that match both preferences of the guest and the host. Thus, a rate at which hosts accept reservation requests from guests may increase, while a rate at which hosts reject reservation requests from guests may decrease.

Figure 1:
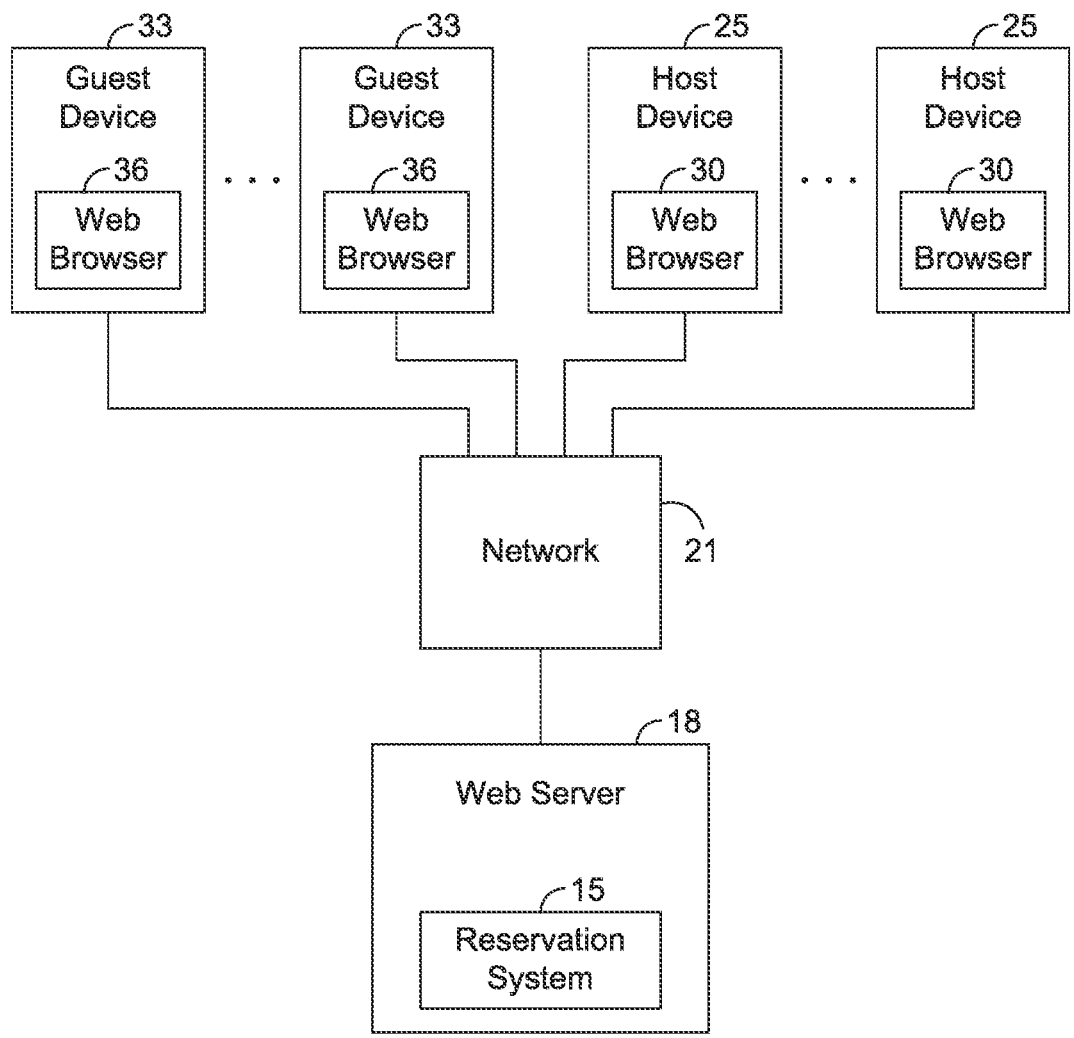
FIG. 1 is a block diagram illustrating a communication system having an online reservation system in accordance with some embodiments of the present disclosure.

FIG. 1 depicts a communication system 12 having an online reservation system 15 in accordance with some embodiments of the present disclosure. As shown by FIG. 1, the reservation system 15 may be implemented by a web server 18 or other type of device or system that is coupled to a network 18, which may comprise one or more network types, such as a local area network (LAN) or a wide area network (WAN). In some embodiments, the network 21 comprises at least the Internet, but other types of networks or combinations of networks are possible in other embodiments.

As shown by FIG. 1, the communication system 12 may comprise a plurality of host devices 25 that may be used by certain users (referred to herein as "hosts") to create, modify, or otherwise manage property listings stored at the web server 18. Each host device 25 may be implemented by one or more computing devices, such a desktop computer, laptop computer, or hand-held computer (e.g., a smartphone) for receiving, processing, and outputting information. As shown by FIG. 1, each host device 25 may store a web browser 30 that can be used to communicate with the web server 18 via the network 21 (e.g., the Internet). In this regard, the web server 18 may provide one or more web pages or other web content that is displayed by a host device 25 and used by a host to manage at least one property listing stored and processed by the online reservation system 15, as will be described in more detail hereafter. In other embodiments, the host device 25 may have an application for accessing the reservation system 15 without the use of a web browser 30. The application also may include resources (e.g., a GUI) that allow the host to manage the property listings by communicating with the web server 18 (e.g., add or remove property listings, accept or reject reservation requests, etc.).

The communication system 12 may also comprise a plurality of guest devices 33 that may be used by guests to request property listing searches, review the results of such searches, and select one or more property listings for bookings. Each guest device 25 may be implemented by one or more computing devices, such a desktop computer, laptop computer, or hand-held computer (e.g., a smartphone) for receiving, processing, and outputting information. As shown by FIG. 1, each guest device 33 may store a web browser 36 that can be used to communicate with the web server 18 via the network 21 (e.g., the Internet). In this regard, the web server 18 may provide one or more web pages or other web content that is displayed by a guest device 33 and used by a guest to search, review, and select property listings stored and processed by the online reservation system 15, as will be described in more detail hereafter. In other embodiments, the guest device 33 may have an application for accessing the reservation system 15 without the use of a web browser 36.

Figure 2:
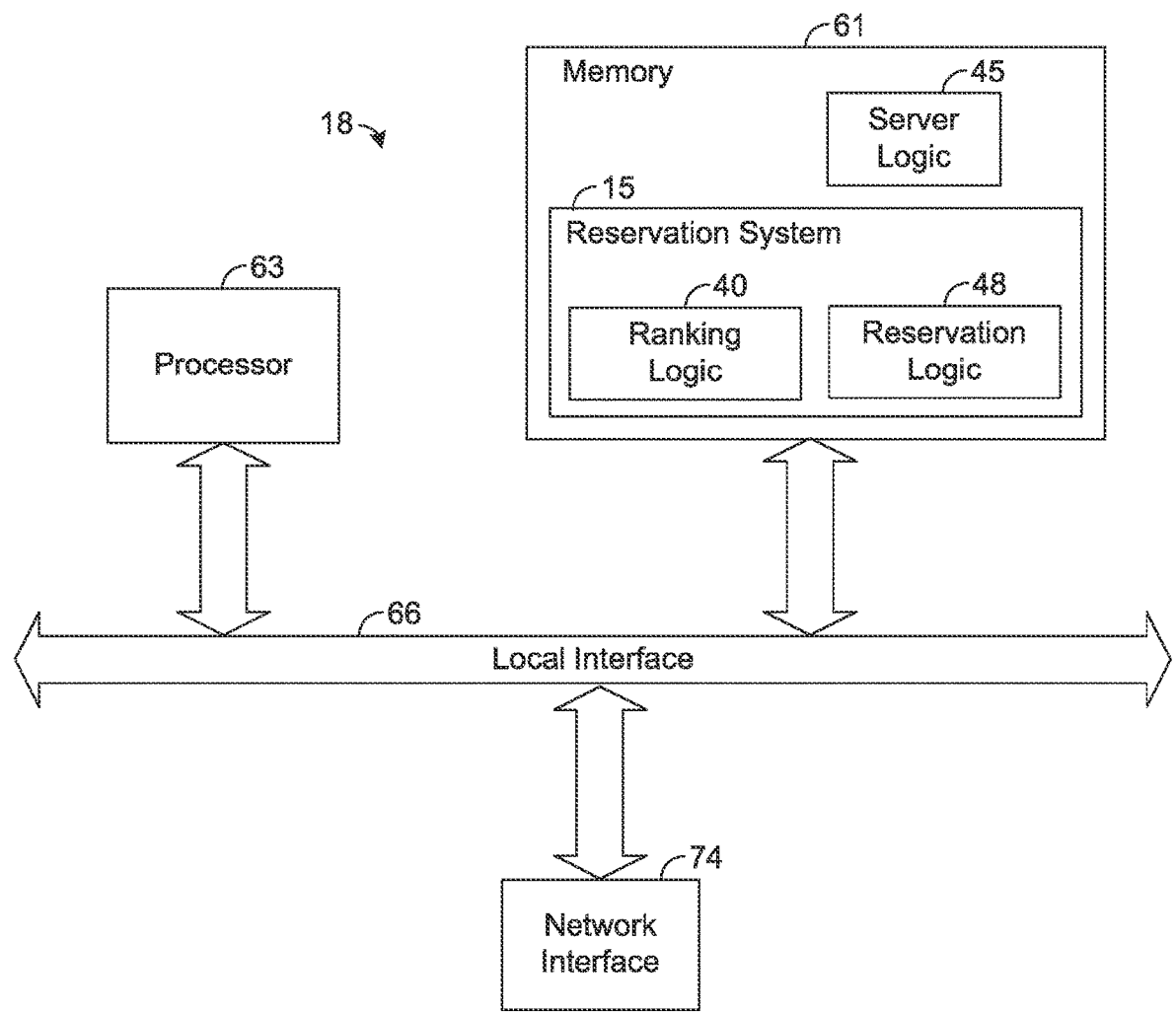
FIG. 2 is a block diagram illustrating a web server implementing an online reservation system in accordance with some embodiments of the present disclosure.

FIG. 2 depicts a web server 18 in accordance with some embodiments of the present disclosure. The web server 18 can include logic 45, referred to herein as "server logic," for generally controlling the operation of the web server 18, including communicating with the host device 30 and the guest devices 33 of the communication system 10. As shown by FIG. 2, the web server 18 may include a reservation system 15 having ranking logic 40 and reservation logic 48 for performing certain functions, as will be described in more detail hereafter. In some embodiments, the reservation system 15 may be implemented as a machine learning system for achieving the functionality described herein. In an embodiment, at least the ranking logic 40 implements a machine learning algorithm (e.g., neural network software) for determining rankings of property listings as will be described in more detail. If desired, the server logic 45 and reservation logic 48 may also implement machine learning algorithms. In other embodiments, other configurations of the web server 18 are possible.

The server logic 45, the reservation logic 48 and the ranking logic 40 can be implemented in software, hardware, firmware or any combination thereof. In the web server 18 shown in FIG. 2, the server logic 45, the reservation logic 48 and the ranking logic 40 are implemented in software and stored in memory 61 of the web server 18. Note that the server logic 45, the reservation logic 48 and the ranking logic 40, when implemented in software, can be stored and transported on any non-transitory computer-readable medium for use by or in connection with an instruction execution apparatus (e.g., a microprocessor) that can fetch and execute instructions. In the context of this disclosure, a "computer-readable medium" can be any device or system that can contain or store a computer program for use by or in connection with an instruction execution apparatus.

The exemplary web server 18 depicted by FIG. 2 comprises at least one conventional processor 63, such as a digital signal processor (DSP) or a central processing unit (CPU), that communicates to and drives the other elements within the web server 18 via a local interface 66, which can include at least one bus. As an example, the processor 63 may execute instructions of software stored in memory 61, such as the server logic 45, the ranking logic 40, and the reservation logic 48. In some embodiments, the processor may comprise an artificial neural network or other type of configuration for performing machine learning functions based on instructions stored in memory 61. Furthermore, the web server 18 may have a network interface 74, such as one or more modems, for exchanging data with the network 21 (FIG. 1).

Figure 3:
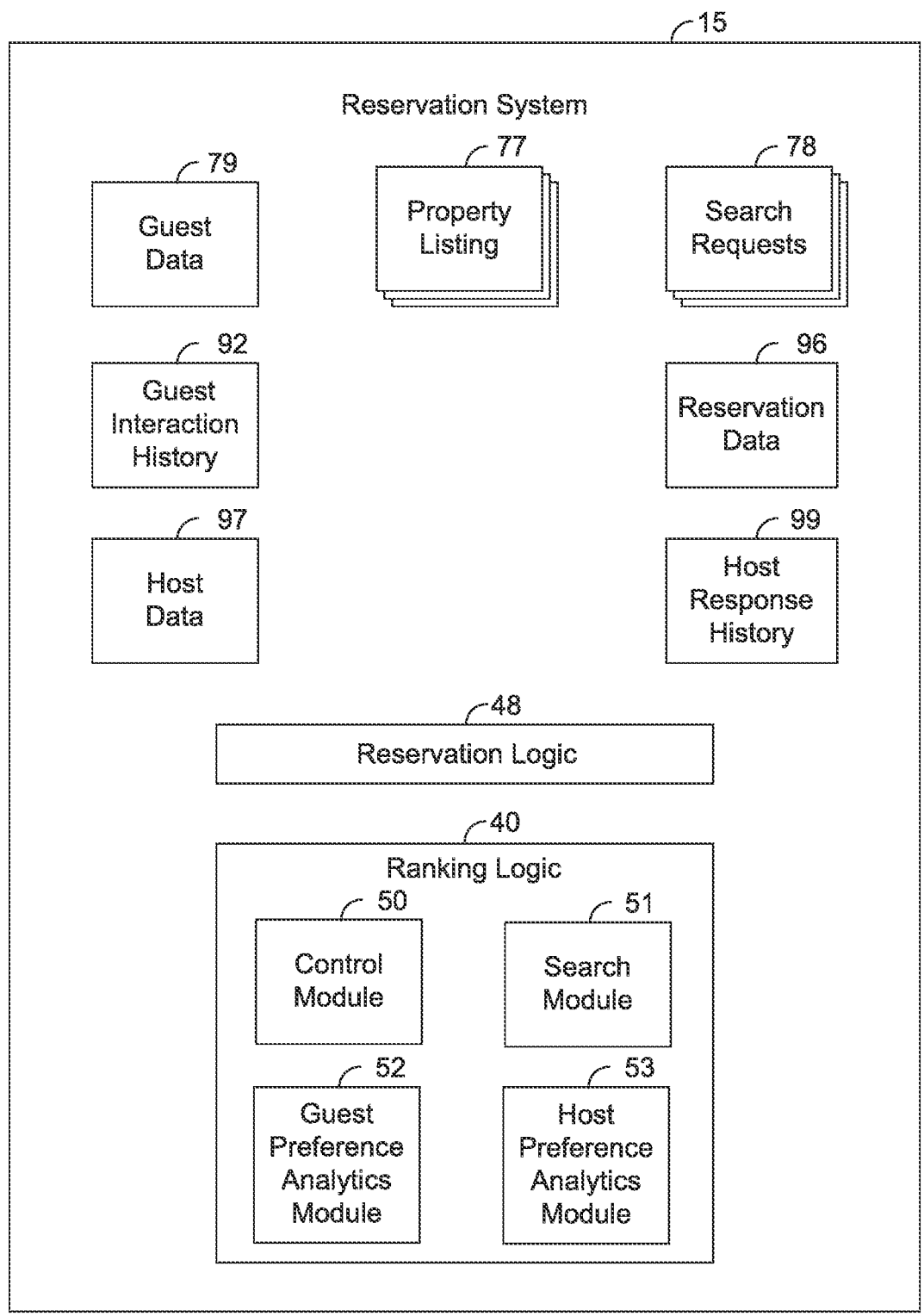
FIG. 3 is a block diagram illustrating an online reservation system in accordance with some embodiments of the present disclosure.

As shown by FIG. 3, the reservation system 15 may include a plurality of property listings 77, which may be stored in the memory 61 (FIG. 1) of the web server 18. As an example, the memory 61 may comprise a database (not specifically shown) in which the property listings 77 can be stored, searched, and manipulated. Each property listing 77 may be associated with a property (e.g., a house, condominium, room, apartment, lot, or other real estate asset) made available by a host for a guest to rent or lease. Such a property listing 77 may be defined by uploading information from a host device 25, but other techniques for defining the property listings 77 are possible in other embodiments. Each property listing 77 includes information about the associated property, and such information may be used by guests in deciding whether to submit a request to a host to allow the guest to book a reservation for the property. As an example, a property listing 77 may include photographs or other images of the property, information describing physical attributes of the property (e.g., number of bedrooms or bathrooms, list of amenities, location, layout, and nearby attractions or activities), information describing rental attributes of the property (e.g., rental price, minimum or maximum length of stay, availability, minimum age for renting, and deposit requirements), or other information that may be of interest to guests in deciding whether to book a reservation for the property.

The reservation system 15 also may include a plurality of search requests 78 stored in memory 61 (FIG. 1). The search requests 78 may be received at the reservation system 15 from guests attempting to identify property listings 77 they may be interested in reserving, such as search requests sent from a guest device 33. Each of the search requests 78 may include information indicative of selections provided by a guest of features or attributes associated with a property listing 77. Such information may be used for filtering property listings 77 returned by the search, such as by the search module 51, as will be described further below. As an example, a search request 78 may specify various information about a property listing 77 specified by a guest, such as property location, property capacity, number of bedrooms and bathrooms, price, desired stay dates and duration, property amenities such as air conditioning, utilities and appliances, and various additional features and amenities, such as availability of parking, a swimming pool, wireless internet access (WiFi), or other recreational and utility resources. The search requests 78 also may include information about the guest requesting the search, such as an identification of the guest.

The reservation system 15 can also include reservation logic 48, guest data 79, guest interaction history information 92, reservation data 96, host data 97, host response history information 99 and ranking logic 40. The reservation logic 48 can be generally configured to control the general operation of the reservation system 15, including responding to and tracking inputs from guests and responses from hosts. The guest data 79 defines information associated with each guest that has registered with the reservation system 15. Guest interaction history 92 can include information indicative of a guest's previous interactions with the reservation system 15, such as information relating to search queries submitted by a guest and property listings 77 that have been selected by the guest from a search results list and reservation requests that the guest has previously submitted. Reservation data 96 can include data indicative of the reservations made by guests and can be maintained by the reservation logic 48. Host data 97 may include information associated with each host that has listed a property for rent or lease through the reservation system 15. Host response history 99 can include information indicative of a host's previous interactions with the reservation system 15, such as responses to reservation requests from guests for each property listing 77 associated with the host. In one embodiment, the reservation logic 48 can update the reservation data 96 only after the host of a property listing 77 agrees to the reservation by the guest. The reservation logic 48 also can update the host response history 99 each time a response to a reservation request is provided. Additional information regarding the operation of the reservation system 15 and reservation logic 48 can be found in U.S. patent application Ser. No. 15/789,622, filed on Oct. 20, 2017, and titled "Systems and Methods for Searching Property Listings," which application is hereby incorporated by reference into this disclosure in its entirety.

In some embodiments, as shown by FIG. 3, the ranking logic 40 may include a control module 50, a search module 51, a guest preference analytics module 52 and a host preference analytics module 53. The control module 50 is generally configured to control the operation of the ranking logic 40, including ranking property listings 77 within ordered lists returned by the search module 51 based on search requests 78. The search module 51 is configured to search the property listings 77 based on search criteria in search requests 78 provided by guests. The guest preference analytics module 52 is configured to analyze guest interactions with the displayed web content (e.g., using information stored in guest interaction history 92) to identify guest preferences for attributes of the property listings 77, as will be described in more detail hereafter. The host preference analytics module 53 is configured to analyze host interactions with the displayed web content (e.g., using information stored in guest interaction history 92) to identify host preferences for attributes of booking requests, as also will be described in more detail hereafter. If desired, the various modules 50-53 may run on different processors 63 so as to increase the speed at which the web server 18 is capable of processing data and responding to guest actions. In other embodiments, it is unnecessary for the ranking logic 40 to have multiple modules and/or to run on multiple processors 63.

In some embodiments, the control module 50 can receive property listings 77 returned by the search module 51 based on search requests 78. The control module 50 can use information stored in memory 61, such as guest interaction history 92 about preferences of the guest that submitted the search request 78 to update or train the guest preference analytics module 52. The control module can also use information stored in memory 61, such as host response history 99 about responses to reservation requests from hosts associated with the property listings to update or train the host preference analytics module 53. The control module 50 may control the ranking of each property listing 77 within the ordered list of property listings returned for the search request 78 based on ranking parameters from each of the guest preference analytics module 52 and host preference analytics module 53.

The guest preference analytics module 52 may be configured to receive information about preferences of the guest that submitted a search request 78 and determine a guest preference score for each property listing 77. The control module 50 can access and provide to the guest preference analytics module 52 data indicative of the guest requesting a search 78 and the guest's preferences, such as from guest data 79, guest interaction history 92 or otherwise. The module 52 can apply a ranking model (e.g., gradient boosting decision trees, tensor flow, neural networks, etc.) of guest preference analytics module 52 to this data to determine a guest preference score for each of the property listings 77, and can provide the data to a guest objective function to train the ranking model to assign a guest preference ranking parameter that is based on each guest preference score. The control module 50 can control the rankings of the property listings 77 within the ordered list returned by the search module 51 based on the guest preference ranking parameter.

In some embodiments, the guest preference analytics module 52 has a ranking model for generating a guest preference score for each property listing 77. In some embodiments, the ranking model can be the same ranking model used by host preference analytics module 53, and can be various models for achieving the functionality described herein. In some embodiments, the ranking model of the guest preference analytics module 52 can comprise a machine learning model, including any or various combinations of models using techniques such as a neural network, boosted decision trees, tensor flow or otherwise. The guest preference analytics module 52 may provide guest preference data (e.g., from guest data 79, guest interaction history 92) to the model, and may determine a guest preference score based on the preference information. The guest preference score indicates an extent to which the property listing 77 matches preferences of the guest. For example, property listings 77 with features that closely match a guest's preferences will receive a higher score than those listings 77 with features that do not match the guest's preferences as well. The guest preference analytics module 52 may determine a guest preference score for each property listing 77 that the control module 50 can use to control rankings of the ordered list of property listings 77. A guest preference score may be determined for each property listing 77 based the ranking model.

The guest preference analytics module 52 also has a guest objective function for training its ranking model and determining a guest preference ranking parameter for each property listing 77. The guest objective function can be various types of objective functions for achieving the functionality described herein, but in some embodiments, the guest objective function comprises an algorithm configured to optimize the score assigned to each listing by the ranking model for utility, such as LambdaRank, LambdaMART, or otherwise. The objective function may optimize the ranking model by modifying to achieve a particular objective, such as maximization of utility achieved by modifying rankings of property listing 77 within an ordered list. In some embodiments, optimization by the objective function may include modification of the rankings based on a ranking gradient assigned to each property listing 77, as described below. The guest objective function also may include other parameters as desired, such as a parameter indicative of a change in normalized discounted cumulative gain (ΔNDGC).

In one embodiment, the guest preference ranking parameter assigned to each property listing 77 may be indicative of a gradient determined according to the guest objective function, and may be determined according to the following exemplary guest objective equation:

$$\lambda_{ij} = \frac{\partial C(s_i - s_j)}{\partial s_i} = \frac{-\sigma}{1 + e^{\sigma(s_i - s_j)}} |\Delta_{NDCG}| \quad (1)$$

where $s_i$ is the guest preference score assigned to a property listing at a first position within the ranking, $s_j$ is the guest preference score assigned to a property listing at a second position within the ranking, C is a utility to be maximized based on positions of the property listings within the ordered list (e.g., rankings) and σ is a parameter indicative of the shape of a desired sigmoid function. Other parameters and objective functions are possible in other embodiments. The control module 50 may use the guest preference ranking parameters associated with each property listing 77 to the control rankings of the ordered list of property listings 77 returned by the search module 51 based on the search request 78.

Note that it is possible for the objective function used to train the ranking model to take into account both guest preferences and host preferences such that a given property listing is generally ranked higher if it better matches the guest preferences of a guest performing a search and if the guest's search request better matches the host preferences. After performing extensive research, experimentation, and analysis on systems employing such techniques, the inventors have discovered that attempting to optimize guest preferences and host preferences in this manner, while providing a better or more favorable ranking from the guest's perspective in terms of finding property listings of interest, can lead to a slight increase in host rejections. A "host rejection" generally refers to a situation where a guest selects a property listing to book and submits a booking request that is ultimately rejected by the host.

The inventors have hypothesized, based on their analysis and research, that training the ranking model with an objective function to increase the rankings of property listings that better match guest preferences and for which the host preferences better match the search request does result in a ranking where property listings deemed favorable to the guest are ranked higher, thereby leading to an increase in booking requests. However, property listings that are highly favorable to the guest remain ranked relatively high, increasing the probability of the guest selecting such highly-favorable property listings, even though booking requests for at least some of such listings are likely to be rejected by the associated hosts based on the host preferences relative to the search request. This results in increased bookings, but also increased host rejection rates. Avoiding even a slight increase in host rejections is highly desirable considering the negative impact a host rejection can have on a guest.

In this regard, having a booking request rejected by a host can be a particularly bad experience for a guest. At the very least, after researching a property listing, a guest may become excited about the prospect of booking the associated property and make an emotional decision to submit a booking request. Thereafter, the guest is often very disappointed to have the booking request rejected and is frustrated that he or she must now find another property, which may be perceived by the guest to be inferior. In addition, when a booking request for a property listing is rejected, all of the time that the guest has spent researching the property listing is essentially wasted leading to guest frustration. In some cases, a guest may even be offended by a rejection, particularly if he or she is not informed of a legitimate reason for the rejection. Such a negative experience may discourage the guest from using the reservation system in the future or submitting other booking requests.

Through their research and analysis of experimental results, the inventors have realized that a better ranking can be achieved if the guest preferences and host preferences are separately optimized through the use of different objective functions so that property listings for hosts likely to reject the guest's booking request are ranked lower (e.g., pushed further down the ordered list returned to the guest so that the guest is less likely to view such property listings) relative to the embodiment described above that uses a single objective function. In this regard, one objective function may be used to train the ranking model in order to optimize guest preferences so that property listings more favorable to the guest are ranked higher, and another objective function may be used to train the ranking model in order to optimize guest preferences so that property listings associated with hosts likely to reject a booking request from the guest are ranked lower.

Figure 4A:
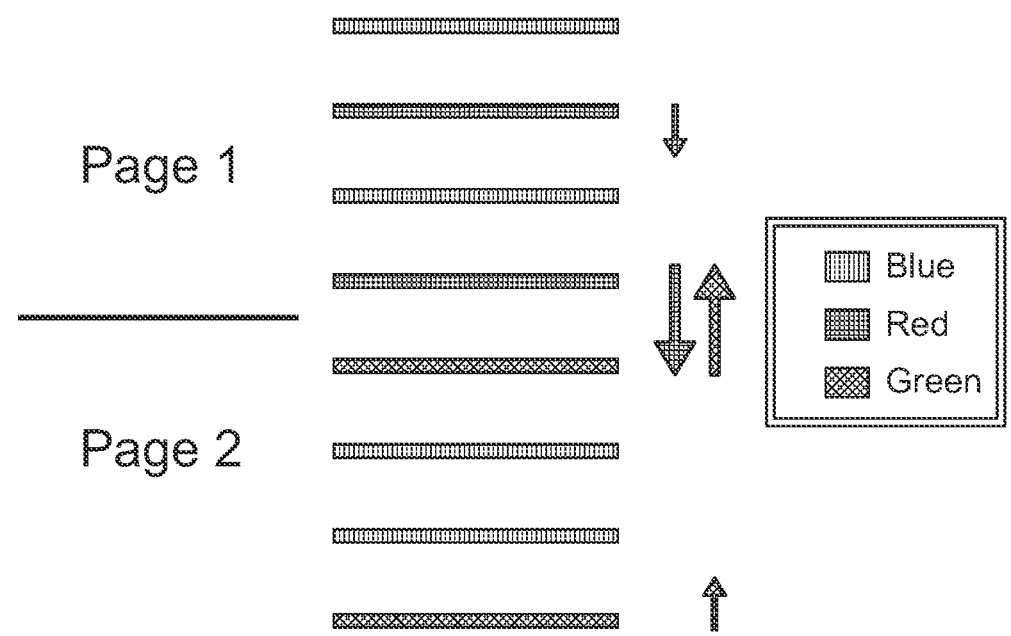
FIG. 4A is a diagram depicting ranking of property listings within a list returned by a search of an online reservation system in accordance with some embodiments of the present disclosure.

FIG. 4A shows how use of separately optimized objective functions can be applied to improve rankings. Separate optimization of objective functions for each of guest preferences and host preferences indicates whether a property listing is associated with a good outcome (e.g., likely to be of interest to the guest and to result in acceptance of the guest's booking request if sent to the host) versus a bad outcome (e.g., unlikely to be of interest to the guest or likely to result in rejection of the guest's booking request by the host). This separate optimization may also determine that some outcomes are neither good, nor bad (e.g., unlikely to have an impact on guest interest or host acceptance or rejection of the guest's booking request). In FIG. 4A, three separate colors are associated with three different hatching types, each of which is indicative of a type of outcome. Objects (e.g., items in rankings, graphic representations of functions, etc.) in FIG. 4A may be associated with any of the three colors. Objects associated with "green" hatching are indicative of good outcomes, while objects associated with "red" hatching are indicative of bad outcomes. Objects associated with "blue" hatching are indicative of outcomes that are not determined either to be good or bad (e.g., neutral). FIG. 4A, shows a ranked list of property listings spanning two pages (e.g., Page 1 and Page 2). A horizontal line indicates a separation between property listings appearing on Page 1 and those appearing on Page 2.

Green and red arrows are associated with some of the items in the list of FIG. 4A, while other items have "blue" hatching, and are not associated with arrows. The arrows that appear next to the list of property listings represent a degree to which (e.g., a utility gradient) the property listing is likely to result in a good outcome (e.g., positive utility) or bad outcome (e.g., negative utility). Arrows pointing toward the top of the listing indicate that the associated property listing should be promoted within the rankings (e.g., pushed to the top) from its current position, while arrows pointing toward the bottom indicate that the associated property listing should be demoted within the rankings (e.g., pushed to the bottom) from its current position. Size of each arrow indicates a magnitude (e.g., "force" or "push") by which the property listing should be promoted or demoted within the rankings. In this regard, a listing associated with a large arrow indicating the listing should be promoted within the ranking may be promoted further within the rankings than another listing associated with a smaller arrow. Similarly, a listing associated with a large arrow indicating that the listings should be demoted within the rankings may be demoted further within the rankings than another listing associated with a smaller arrow.

Rankings for such property listings also may be adjusted between pages property listings. For example, a property listing associated with a large red arrow and appearing near the bottom of Page 1 may be pushed down the rankings a number of positions (e.g., to a lower ranking having a position on Page 2), while a property listing associated with a large green arrow and appearing near the top of Page 2 may be pushed up the rankings a number of positions (e.g., to a higher ranking having a position on Page 1). A property listing associated with a neutral outcome (e.g., "blue" hatching) may not be pushed higher or lower in the rankings, although its position may change due to changes in positions of property listings associated with good or bad outcomes as described above.

Figure 4B:
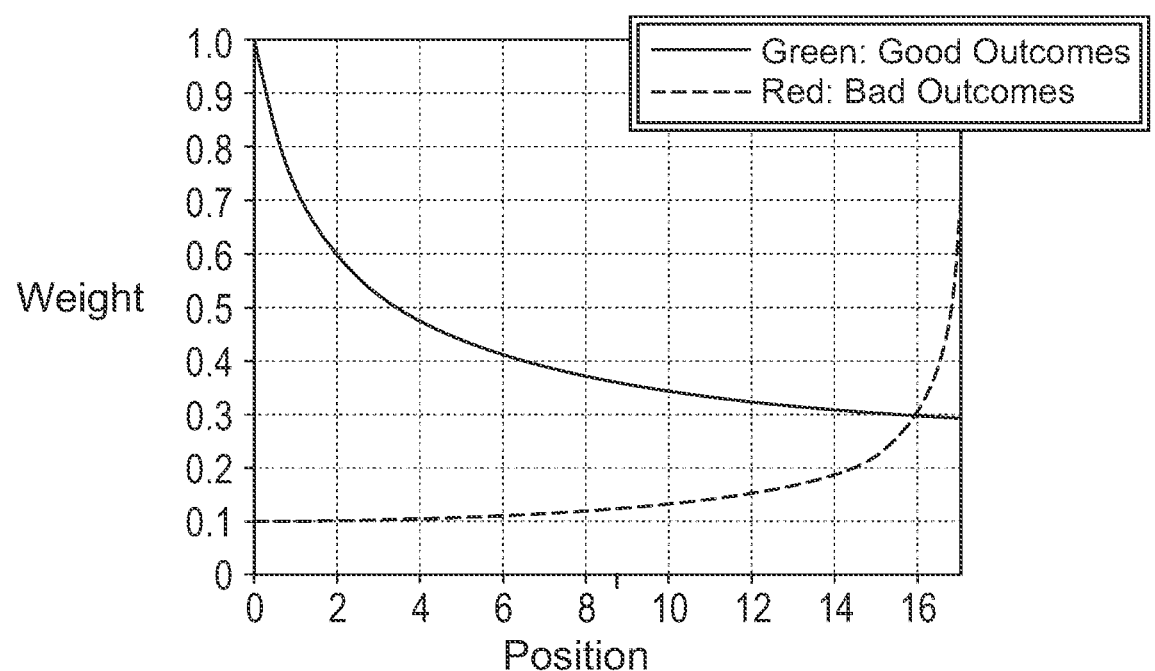
FIG. 4B is a plot of depicting utility weights versus rankings of property listings within a list returned by a search of an online reservation system in accordance with some embodiments of the present disclosure.

There are various techniques that can be used to separately optimize guest preferences and host preferences, as described above. As an example, the ranking model can be trained using one objective function to provide a guest preference score for each property listing, as described above, and this guest preference score may be used to adjust the ranking score and, hence, rank of the property listing. As an example, the rank of the property listing may be increased the better it matches the guest preferences (e.g., good outcomes, associated with a solid-line curve indicated as "green" in FIG. 4B). As shown graphically by FIG. 4B, which depicts utility weights versus rankings of property listings within a list returned by a search, the use of such separate objective functions has the benefit of better suppressing (i.e., lowering the rank of) property listings associated with hosts that are likely to reject a booking request from the guest (e.g., bad outcomes, associated with a dashed-line curve indicated as "red" in FIG. 4B), thereby reducing the likelihood of host rejections. The ranking model can also be trained using a different objective function to provide a score, referred to hereafter as "host preference score," for each property listing indicating an extent to which the guest's search request matches the preferences of the host associated with the property listing. This host preference score may be used to adjust the ranking score and, hence, rank of the property listing. As an example, the rank of the property listing may be decreased the less it matches the host preferences. Exemplary techniques for determining a host preference score and adjusting rankings based on such score will be described in more detail below.

In this regard, operation of the host preference analytics module 53 of FIG. 3 may be similar to the operation of guest preference analytics module 52. The host preference analytics module 53 may be configured to receive information about preferences of a host associated with each property listing 77 identified by the search module 51 based on a search request 78 and determine a host preference score for each property listing 77. The control module 50 can access and provide to the host preference analytics module 53 data indicative of the host associated with each property listing 77 in the search request 78 and the host's preferences, such as from host data 79, host response history 99 or otherwise. The module 53 can apply a ranking model (e.g., gradient boosting decision trees, tensor flow, neural networks, etc.) of host preference analytics module 53 to this data to determine a host preference score for each of the property listings 77, and can provide the data to a host objective function to train the ranking model to assign a host preference ranking parameter that is based on the host preference score for each property listing 77. The control module 50 can control the rankings of the property listings 77 within the ordered list returned by the search module 51 based on the host preference score.

In some embodiments, the host preference analytics module 53 has a ranking model for generating a host preference score for each property listing 77. As noted above with regard to the guest preference analytics module 52, in some embodiments, the ranking model may be the ranking model of guest preference analytics module 52 (e.g., a commonly used ranking model for assigning scores based on host preferences, guest preferences, or combinations thereof, which scores may be adjusted for ranking purposes using separately optimized objective functions). The ranking model can be various types of models for achieving the functionality described herein, but in some embodiments, the ranking model of the host preference analytics module 53 can comprise a machine learning model, including any or various combinations of models using techniques such as a neural network, boosted decision trees, tensor flow or otherwise. The host preference analytics module 53 may provide host preference data (e.g., from host data 97, host response history 99) to the ranking model, and may determine a host preference score based on the host preference information. The host preference score indicates an extent to which the search request 78 matches preferences of the host.

For example, search requests 78 that include information that closely matches the host's preferences may result in a host's property listings 77 returned by the search request 78 receiving a higher host preference score than those property listings 77 returned by the search for which the search request 78 does not closely match the host's preferences (thereby indicating that the host is likely to reject a reservation request for the host's property listing 77 returned by the search request 78). The host preference analytics module 53 may determine a host preference score for each property listing 77 that the control module 50 can use to control rankings of the ordered list of property listings 77. A host preference score may be determined for each property listing 77 based the host ranking model.

The host preference analytics module 52 also has a host objective function for training the ranking model and determining a host preference ranking parameter for each property listing 77. The host objective function can be various types of objective functions for achieving the functionality described herein, but in some embodiments, the host objective function comprises an algorithm configured to optimize the score assigned to each listing by the ranking model for utility, such as LambdaRank, LambdaMART, or otherwise. The objective function may optimize the ranking model by modifying to achieve a particular objective, such as maximization of utility achieved by modifying rankings of property listing 77 within an ordered list. In some embodiments, optimization by the objective function may include modification of the rankings based on a ranking gradient assigned to each property listing 77. The host objective function also may include other parameters as desired, such as a parameter indicative of a change in normalized discounted cumulative gain (ΔNDGC) or other comparable parameter for measuring cost associated with a particular ranking. In one embodiment, the host preference ranking parameter assigned to each property listing 77 may be indicative of a gradient determined according to the host objective function, and may be determined using techniques similar to those set forth in Equation (1) above, although other functions and parameters are possible in other embodiments. The control module 50 may use the host preference ranking parameters associated with each property listing 77 to the control rankings of the ordered list of property listings 77 returned by the search module 51 based on the search request 78.

Note that guest preferences and host preferences utilized by each of the guest preference analytics module 52 and host preference analytics module 53 may include various categories of information that a guest or host may consider as part of interaction with the online reservation system 15. Exemplary preferences are described in further detail in U.S. patent application Ser. No. 15/789,622, filed on Oct. 20, 2017, and titled "Systems and Methods for Searching Property Listings," U.S. patent application Ser. No. 14/505,455, filed on Oct. 2, 2014, and titled "Determining Host Preferences for Accommodation Listings," and U.S. Patent Application Publication No. 20170178036, filed on Mar. 7, 2017, and titled "Unique Accommodation Search Improvement Founded in Listing Booking Conversion," each of which is hereby incorporated by reference into this disclosure in its entirety. Additional examples of information that may be used by the host preference analytics module 53 include any of the guest's preferences, leading days before or following an existing reservation, a host's previous rejection of a reservation request for a given day, reservations resulting in back-to-back bookings (e.g., conflicting with cleaning or refresh periods for the host's property), guest reservation history, gaps between guest check-in dates and check-out dates, stay length, or otherwise. In some embodiments, other information affecting a guest's decision to submit a request to reserve a property or information affecting a host's decision to accept a request to reserve a property may be used by resources of the ranking logic 40.

Figure 5:
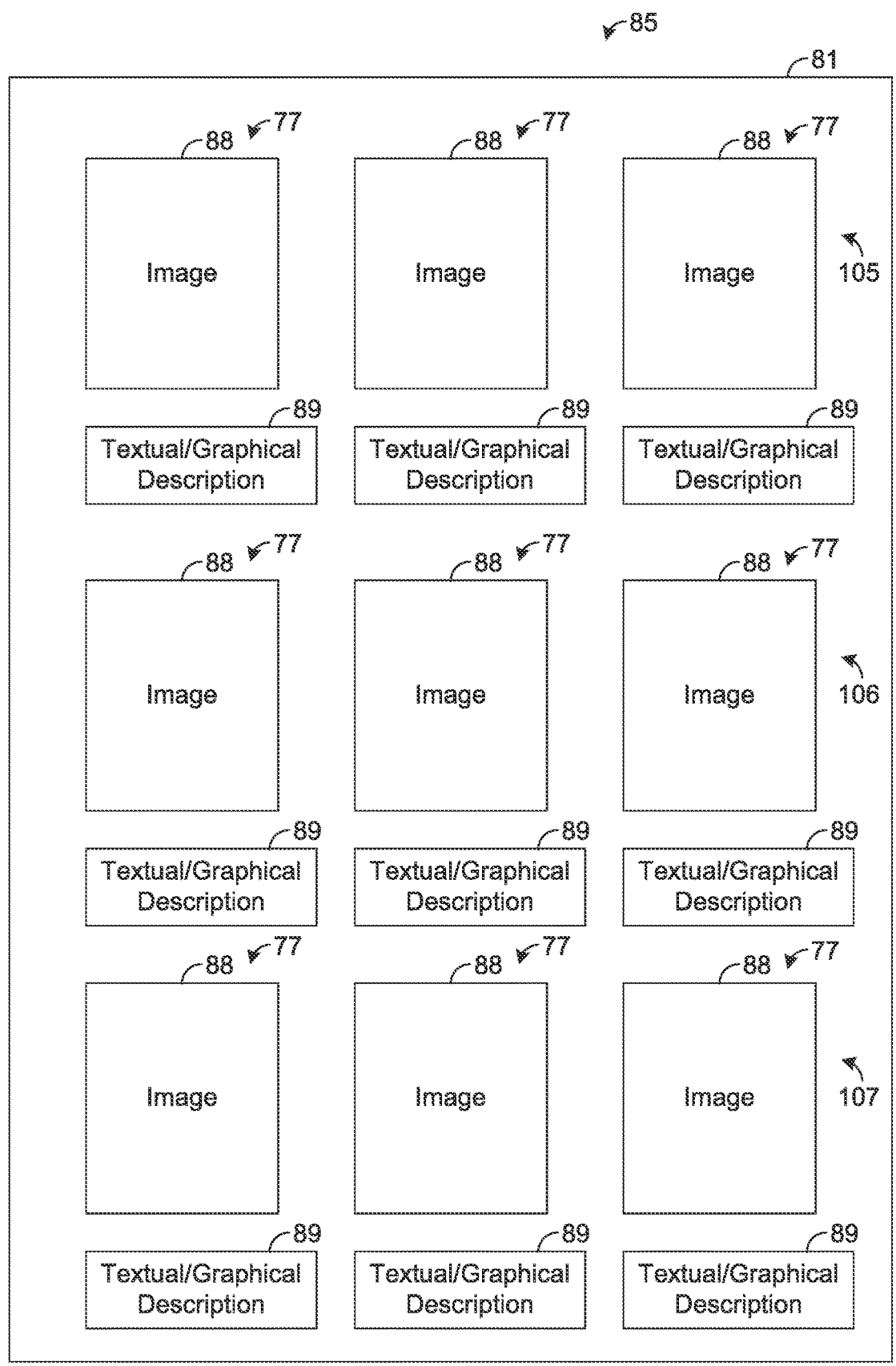
FIG. 5 is a block diagram illustrating a displayed list of property listings in accordance with some embodiments of the present disclosure.
Figure 6:
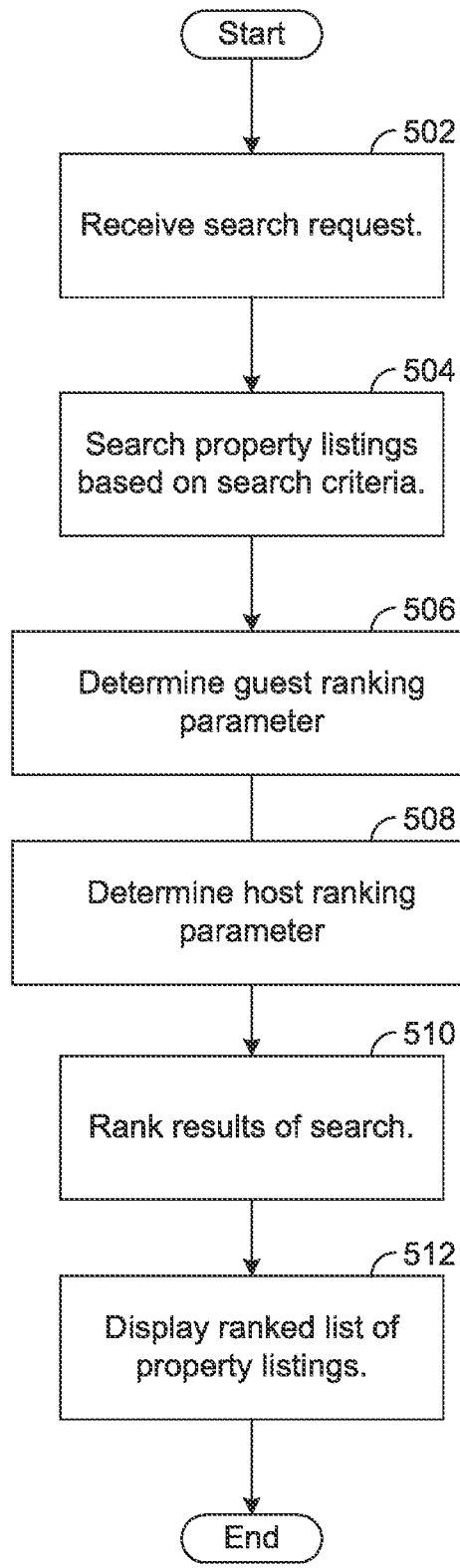
FIG. 6 is a flow chart illustrating an exemplary method for ranking property listing search results in accordance with some embodiments of the present disclosure.

The ranking logic 40 can control the order of property listings 77 within a sorted list 85 displayed by the reservation logic 48, as depicted by FIG. 5. When a guest submits a search request 78 to the reservation system 15, as in step 502 of FIG. 6, the search module 51 may search property listings 77 based on the guest's search criteria, as performed in step 504. The search module 51 may perform its search of the property listings 77 and return a plurality of property listings 77 based on the search criteria, as in step 114 of FIG. 6. The ranking logic 40 may receive the property listings 77 returned by the search module 51, and may use the guest preference analytics module 52 to determine a guest ranking parameter associated with each property listing 77 based on information stored in memory 61 as guest interaction history 92 indicative of the preferences of the guest that requested the search, such as at step 506. The ranking logic 40 also may note information about the search request 78 submitted by the guest and may use the host preference analytics module 53 to determine a guest ranking parameter associated with each property listing 77 based on information stored in memory 61 as host response history 99 to determine a host ranking parameter associated with each property listing 77, such as at step 508. The ranking logic 40 may then use each of the guest ranking parameter and host ranking parameter to rank the results of the search, such as by comparing the two parameters to determine a ranking, as in step 510. As an example, the ranking logic 40 may compare the guest ranking parameter with the host ranking parameter (e.g., by subtraction, determining a net value, etc.) and may determine a difference between the guest ranking parameter based on the comparison. The ranking logic 40 may determine a final ranking for the property listing based on the comparison. The ranking logic 40 can repeat this step for each property listing to determine a ranking within the ordered list. In other embodiments, other techniques for determining a ranking for each property listing within the ordered list based on its guest ranking parameter and host ranking parameter are possible, including averaging the scores to determine an arithmetic mean, or otherwise. After the ranking logic 40 has ranked the property listings 77 returned by the search request 78, at step 512, the reservation logic 48 may display a ranked list of the property listings 77 based on the rank assigned to each by the ranking logic 40.

Note that, as shown by FIG. 5, ranking of the property listings 77 within the displayed list 85 may correspond to a position of each property listing 77 within the list 85. For example, a left-most listing 77 on top row 105 may have a higher ranking assigned by the ranking logic 40 thank a middle listing 77, which in turn may have a higher ranking than a right-most listing 77. Listings 77 in each of middle row 106 and bottom row 107 also may have similar rankings that decrease by position from left-most to right-most. The list 85 may include various other information associated with each listing 77 at a position corresponding to the ranking of the listing 77, such as an image 88, description 89, or otherwise. Other techniques and arrangements for ranking the property listings 77 within the list 85 may be used in other embodiments.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A reservation system for available property listings, comprising:
   memory for storing the available property listings; and
   a machine learning system configured to:
      receive a plurality of search requests submitted by a guest for requesting searches of the available property listings;
      provide ordered lists of the available property listings in response to the search requests, the plurality of search requests including a first search request and the ordered lists including a first ordered list provided by the machine learning system in response to the first search request;
      receive first data indicative of interactions by the guest with the ordered lists;
      receive second data indicative of host responses to reservation requests for the available property listings, the host responses from hosts associated with the available property listings;
      analyze the first data for each of a plurality of the ordered lists according to a first objective function using a first ranking model of the machine learning system to rank the available property listings based on an extent to which each respective one of the plurality of the available property listings matches preferences of the guest, as indicated by the interactions by the guest, wherein the interactions by the guest include prior search requests for available property listings, reservation requests and reservations by the guest and wherein a respective available property listing is ranked higher if the respective available property listing better matches the preferences of the guest, wherein the first ranking model is trained based on the interactions by the guest and interactions by other guests;
      analyze the second data for each of a plurality of the ordered lists according to a second objective function for training a second ranking model of the machine learning system to rank the available property listings based on an extent to which preferences of the hosts, as indicated by the host responses to prior reservation requests, match the first search request; and
      rank a plurality of the available property listings within the first ordered list based on a ranking of the available property listings by the first ranking model and a ranking of the available property listings by the second ranking model.

2. The reservation system of claim 1, wherein the first objective function comprises a LambdaRank function.

3. The reservation system of claim 1, wherein the first objective function comprises a LambdaMART function.

4. The reservation system of claim 1, wherein the plurality of available property listings is displayed based on a ranking of each available property listing within the first ordered list.

5. The reservation system of claim 1, wherein the first ordered list includes at least a first available property listing and a second available property listing, wherein the machine learning system is configured to determine, based on the first objective function, a guest ranking parameter associated with the first available property listing and indicating a ranking of the first available property listing determined by the first ranking model, wherein the machine learning system is configured to determine, based on the second objective function, a host ranking parameter associated with the first available property listing and indicating a ranking of the first available property listing determined by the second ranking model, and wherein the machine learning system is configured to determine a rank of the first available property listing within the first ordered list based on the guest ranking parameter and the host ranking parameter.

6. The reservation system of claim 1, wherein the preferences of the guest and the preferences of the hosts are separately optimized by the first objection function and the second objective function, respectively, during training of the machine learning system such that at least one available property listing within the first ordered list associated with a host likely to reject a booking request from the guest is ranked lower.

7. The reservation system of claim 5, wherein the machine learning system is configured to determine the rank of the first available property listing within the first ordered list by comparing the guest ranking parameter and the host ranking parameter.

8. The reservation system of claim 5, wherein the machine learning system is configured to determine the rank of the first available property listing within the first ordered list by subtracting the guest ranking parameter and the host ranking parameter.

9. An online reservation system, comprising:
   memory for storing available property listings; and
   a machine learning system configured to:
      optimize a plurality of objective functions for controlling rankings of a plurality of available property listings within ordered lists provided in response to a plurality of search requests submitted by guests;
      receive first data indicative of interactions by the guest with each of a plurality of the ordered lists;
      receive second data indicative of host responses to reservation requests for the available property listings, the host responses from hosts associated with the available property listings;
      optimize a first ranking model of the machine learning system using a first objective function based on the first data for ranking the available property listings based on an extent to which each respective one of the plurality of the available property listings matches preferences of the guest, as indicated by the interactions by the guest, wherein the interactions by the guest include prior search requests for available property listings, reservation requests and reservations by the guest and wherein a respective available property listing is ranked higher if the respective available property listing better matches the preferences of the guest, wherein the first ranking model is trained based on the interactions by the guest and interactions by other guests;
      optimize a second ranking model using a second objective function based on the second data for ranking the available property listings based on an extent to which preferences of the hosts, as indicated by the host responses to prior reservation requests, match a first search request of the plurality of search requests; and
      rank a plurality of the available property listings within the first ordered list based on a ranking of the available property listings by the first ranking model and a ranking of the available property listings by the second ranking model.

10. The online reservation system of claim 9, wherein the first objective function comprises a LambdaRank function.

11. The online reservation system of claim 9, wherein the first objective function comprises a LambdaMART function.

12. The online reservation system of claim 9, wherein the plurality of available property listings is displayed based on a ranking of each available property listing within the first ordered list.

13. A method for ranking available property listing search results in a reservation system having a machine learning system, comprising:
receiving, at the machine learning system, a plurality of search requests from a guest for requesting searches of available property listings stored in a memory of the reservation system, wherein the plurality of search requests comprises a first search request;
providing, from the machine learning system, ordered lists of the available property listings in response to the search requests, wherein the ordered lists comprises a first ordered list provided by the machine learning system in response to the first search request;
receiving, at the machine learning system, first data indicative of interactions by the guest with the ordered lists;
receiving, at the machine learning system, second data indicative of host responses to reservation requests for the available property listings, wherein the host responses are received from hosts associated with the available property listings;
analyzing, at the machine learning system, the first data for each of a plurality of the ordered lists according to a first objective function using a first ranking model of the machine learning system to rank the available property listings based on an extent to which each respective one of the plurality of the available property listings matches preferences of the guest, as indicated by the interactions by the guest, wherein the interactions by the guest include prior search requests for available property listings, reservation requests and reservations by the guest and wherein a respective available property listing is ranked higher if the respective available property listing better matches the preferences of the guest, wherein the first ranking model is trained based on the interactions by the guest and interactions by other guests;
analyzing, at the machine learning system, the second data for each of a plurality of the ordered lists according to a second objective function for training a second ranking model of the machine learning system to rank the available property listings based on an extent to which preferences of the hosts match the first search request, as indicated by the host responses; and
ranking, at the machine learning system, a plurality of the available property listings within the first ordered list based on a ranking of the available property listings by the first ranking model and a ranking of the available property listing by the second ranking model.

14. The method of claim 13, wherein the first objective function comprises a LambdaRank function.

15. The method of claim 13, wherein the first objective function comprises a LambdaMART function.

16. The method of claim 13, further comprising displaying, at a display of the reservation system, a plurality of available property listings based on a ranking of each available property listing within the first ordered list.

17. The method of claim 13, wherein the first ordered list includes at least a first available property listing and a second available property listing, and wherein the method further comprises:
determining, at the machine learning system, a guest ranking parameter associated with the first available property listing and indicating a ranking of the first available property listing determined by the first ranking model;
determining, at the machine learning system, a host ranking parameter associated with the first available property listing and indicating a ranking of the first available property listing determined by the second ranking model; and
determining, at the machine learning system, a rank of the first available property listing within the first ordered list based on the guest ranking parameter and the host ranking parameter.

18. The method of claim 17, further comprising comparing, at the machine learning system, the guest ranking parameter and the host ranking parameter, wherein the determining the rank of the first available property listing within the first ordered list is based on the comparing.

19. The method of claim 17, further comprising subtracting, at the machine learning system, the guest ranking parameter and the host ranking parameter, wherein the determining the rank of the first available property listing within the first ordered list is based on the subtracting.

20. A method for ranking available property listing search results in a reservation system having a machine learning system, comprising:
receiving, at the machine learning system, a plurality of search requests from a guest for requesting searches of available property listings stored in a memory of the reservation system, wherein the plurality of search requests comprises a first search request;
providing, from the machine learning system, ordered lists of the available property listings in response to the search requests, wherein the ordered lists comprises a first ordered list provided by the machine learning system in response to the first search request, wherein the first ordered list includes at least a first available property listing and a second available property listing;
receiving, at the machine learning system, first data indicative of interactions by the guest with the ordered lists;
receiving, at the machine learning system, second data indicative of host responses to reservation requests for the available property listings, wherein the host responses are received from hosts associated with the available property listings;
analyzing, at the machine learning system, the first data for each of a plurality of the ordered lists according to a first objective function using the machine learning system to control rankings of a plurality of the available property listings within the first ordered list based on an extent to which each respective one of the plurality of the available property listings matches preferences of the guest, as indicated by the interactions by the guest, wherein the interactions by the guest include prior search requests for available property listings, reservation requests and reservations by the guest and wherein a respective available property listing is ranked higher if the respective available property listing better matches the preferences of the guest, wherein the machine learning system is trained based on the interactions by the guest and interactions by other guests;

analyzing, at the machine learning system, the second data for each of a plurality of the ordered lists according to a second objective function for training the machine learning system to control the rankings of the plurality of the available property listings within the first ordered list based on an extent to which preferences of the hosts match the first search request, as indicated by the host responses to prior reservation requests;

determining, at the machine learning system based on the first objective function, a guest ranking parameter associated with the first available property listing based on an extent to which the first available property listing matches the preferences of the guest;

determining, at the machine learning system based on the second objective function, a host ranking parameter associated with the first available property listing based on an extent to which the first search request matches preferences of the host for the first available property listing:

comparing, at machine learning system, the guest ranking parameter and the host ranking parameter, wherein the comparing comprises subtracting the guest ranking parameter and the host ranking parameter; and determining, at the machine learning system, a rank of the first available property listing within the first ordered list based on the comparing.

21. A reservation system for available property listings, comprising:

memory for storing the available property listings; and
a machine learning system configured to:
receive a plurality of search requests submitted by a guest for requesting searches of the available property listings;
provide ordered lists of the available property listings in response to the search requests, the plurality of search requests including a first search request and the ordered lists including a first ordered list provided by the machine learning system in response to the first search request;
receive first data indicative of interactions by the guest with the ordered lists and to receive second data indicative of host responses to reservation requests for the available property listings, the host responses from hosts associated with the available property listings;
analyze the first data for each of a plurality of the ordered lists according to a first objective function using the machine learning system to rank a plurality of the available property listings within the first ordered list based on an extent to which each respective one of the plurality of the available property listings matches preferences of the guest, as indicated by the interactions by the guest, wherein the interactions by the guest include prior search requests for available property listings, reservation requests and reservations by the guest and wherein a respective available property listing is ranked higher if the respective available property listing better matches the preferences of the guest, wherein the machine learning system is trained based on the interactions by the guest and interactions by other guests;
analyze the second data for each of a plurality of the ordered lists according to a second objective function for training the machine learning system to control the rankings of the plurality of the available property listings within the first ordered list based on an extent to which preferences of the hosts, as indicated by the host responses to prior reservation requests, match the first search request, wherein the first ordered list includes at least a first available property listing and a second available property listing;
determine, based on the first objective function, a guest ranking parameter associated with the first available property listing based on an extent to which the first available property listing matches the preferences of the guest;
determine, based on the second objective function, a host ranking parameter associated with the first available property listing based on an extent to which the first search request matches preferences of the host for the first available property listing; and
subtract the guest ranking parameter and the host ranking parameter for determining a rank of the first available property listing within the first ordered list.

* * * * *